United States Patent

[11] 3,613,819

| [72] | Inventor | Walter H. Maloney<br>520 Ascot Ridge, Rock Hill, S.C. 29730 |
|---|---|---|
| [21] | Appl. No. | 21,234 |
| [22] | Filed | Mar. 20, 1970 |
| [45] | Patented | Oct. 19, 1971 |

[54] RETRACTABLE SEATBELT ASSEMBLY
9 Claims, 12 Drawing Figs.

[52] U.S. Cl. .................................................. 180/82,
297/388, 280/150 SB
[51] Int. Cl. ............................................ B60r 21/10
[50] Field of Search .......................................... 280/150
SB; 180/82; 297/388, 385; 52/2, 111, 114;
242/107 SB

[56] References Cited
UNITED STATES PATENTS

| 3,101,134 | 8/1963 | Winkelmann | 52/111 |
| 3,190,694 | 6/1965 | Isaac | 297/388 |
| 3,314,719 | 4/1967 | Johnson | 297/385 |
| 3,343,623 | 9/1967 | Porter | 180/82 |
| 3,391,961 | 7/1968 | Gardner et al. | 280/150 X |

*Primary Examiner*—Kenneth H. Betts
*Attorneys*—Clarence A. O'Brien and Harvey B. Jacobson ABSTRACT: An elongated arcuate support structure composed of telescopingly engaged short arcuate tubular sections extendible and retractable relative to each other between retracted positions disposed at one side of an associated vehicle seat structure and extended positions extending across the associated seat structure in the manner of a seatbelt structure. A drive assembly is provided for extending and retracting the elongated support structure and the drive assembly includes a control assembly for automatically actuating the drive assembly to extend and retract the support structure each time an associated vehicle ignition switch is turned on and also when the ignition switch is turned off. A spring reel mounted protractable seatbelt assembly is disposed alongside the support structure and the extendible end of the latter includes a clamp releasably frictionally engageable with the extendible end of the seatbelt for protracting the latter upon extension of the support structure and retracting the seatbelt upon retraction of the support structure. However, an anchor assembly is supported adjacent the other side of the associated seat structure and includes a clamp structure operable to automatically anchor the protractable end of the seatbelt when initially advanced there toward whereby the seatbelt will be securely anchored and subsequent retraction of the support assembly will be accomplished independent of retraction of the seatbelt. The anchor assembly further includes means whereby the next protraction of the support structure to its extended position will automatically release the protracted end of the seatbelt for retraction together with the support structure upon its next subsequent retraction.

Walter H. Maloney
INVENTOR.

BY Clarence A. O'Brien
and Harvey B. Jacobson
Attorneys

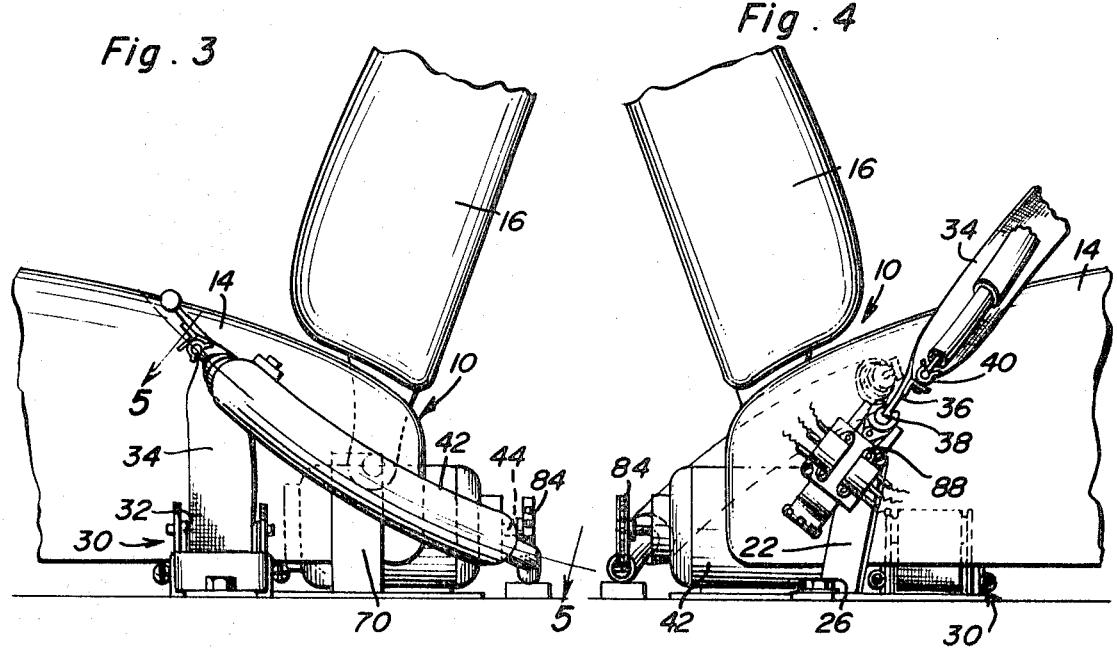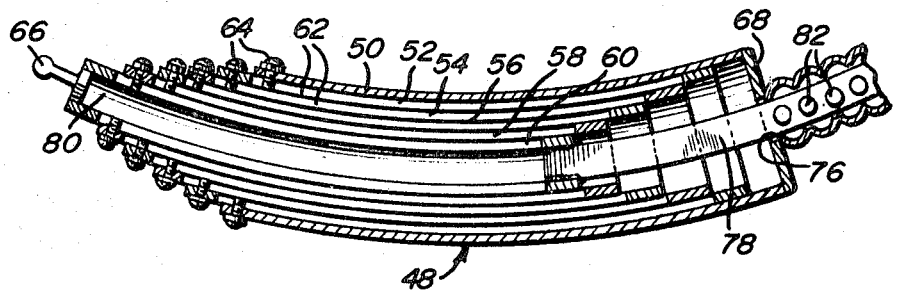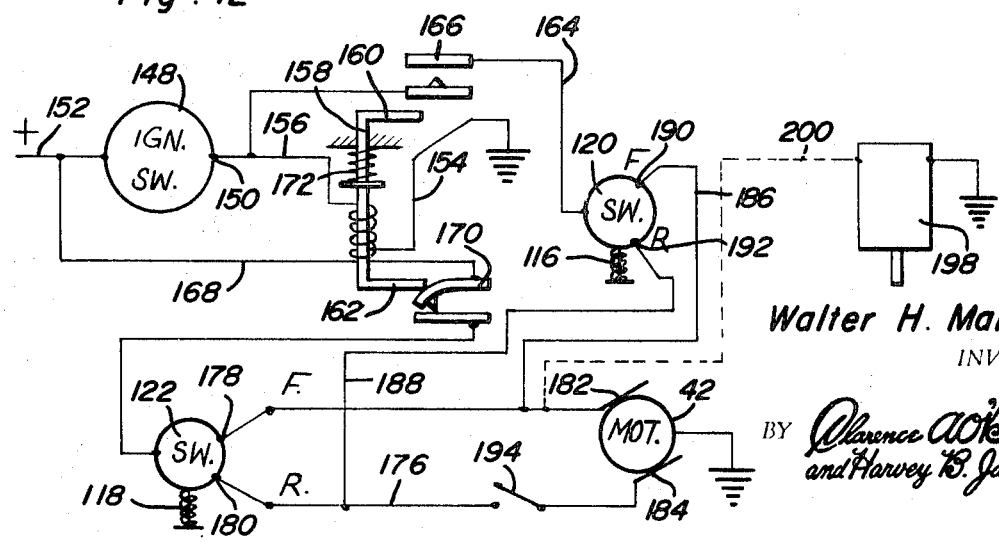

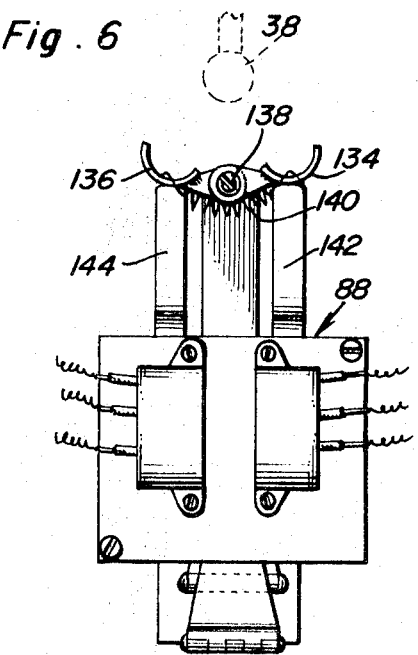
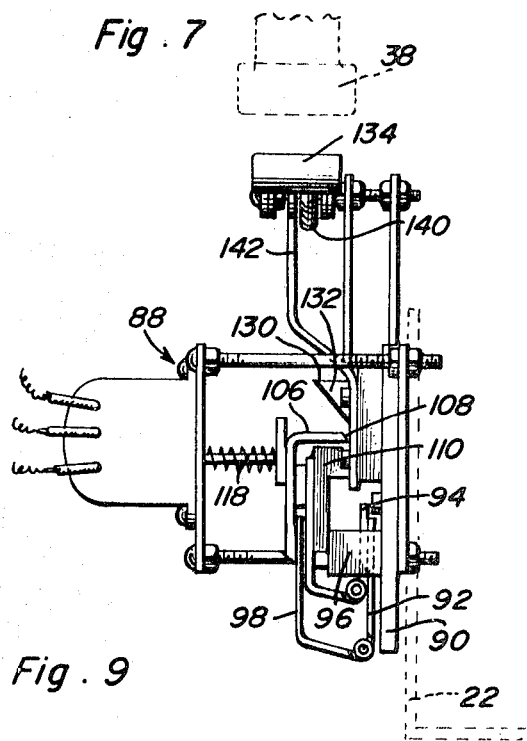
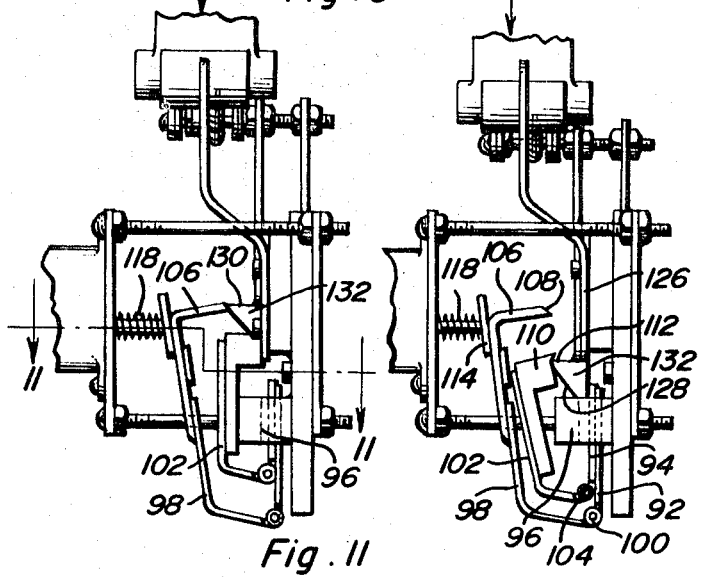
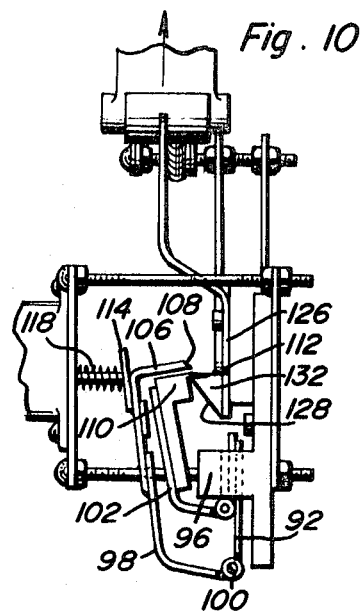
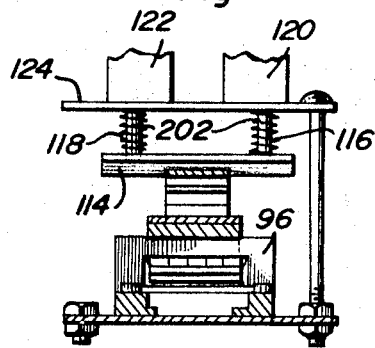
Walter H. Maloney
INVENTOR.

RETRACTABLE SEATBELT ASSEMBLY

The main object of this invention is to provide a seatbelt assembly including supporting and protracting structure as well as automatic control structure which coact to automatically protract and anchor a vehicle seatbelt in operative position whenever the ignition switch of the associated vehicle is turned on.

Still another important object of this invention is to provide an apparatus in accordance with the immediately preceding object and which will also function to automatically release and retract the seatbelt when the ignition switch of the associated motor vehicle is turned off.

A further object of this invention is to provide an automatically protractable and retractable seatbelt assembly including structure for protracting the seatbelt element portion thereof in a manner such that when the seatbelt element is properly anchored in a protracted position the seatbelt will be automatically properly tensioned without further adjustment.

A final object of this invention to be specifically enumerated herein is to provide an automatically protractable and retractable seatbelt assembly in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a fragmentary left side elevational view of the assemblage illustrated in FIGS. 1 and 2;

FIG. 4 is a fragmentary right side elevational view of the assemblage illustrated in FIGS. 1–3;

FIG. 5 is a fragmentary enlarged sectional view taken substantially upon the plane indicated by the section line 5—5 of FIG. 3;

FIG. 6 is an elevational view of the seatbelt element anchoring structure;

FIG. 7 is an elevational view of the seatbelt anchoring structure as seen from the right side of FIG. 6 and with the anchoring structure in the full release position;

FIG. 8 is a view similar to FIG. 7 but illustrating the anchor structure just prior to its movement into a position operative to anchor the protractable end of the associated seatbelt in an extended position upon protraction of the seatbelt element;

FIG. 9 is a view similar to FIG. 8 illustrating the components of the anchor structure in their relative positions assumed upon the second protraction of the seatbelt support structure just prior to retraction of the support structure to achieve retraction of the seatbelt;

FIG. 10 is a view similar to FIGS. 7–9 but illustrating the seatbelt structure in an initially retracted position;

FIG. 11 is a fragmentary sectional view taken substantially upon the plane indicated by the section line 11—11 of FIG. 8; and FIG. 12 is a diagrammatic view of one form of actuating electrical circuit which may be utilized to control the retractable seatbelt assembly.

Figure 1:
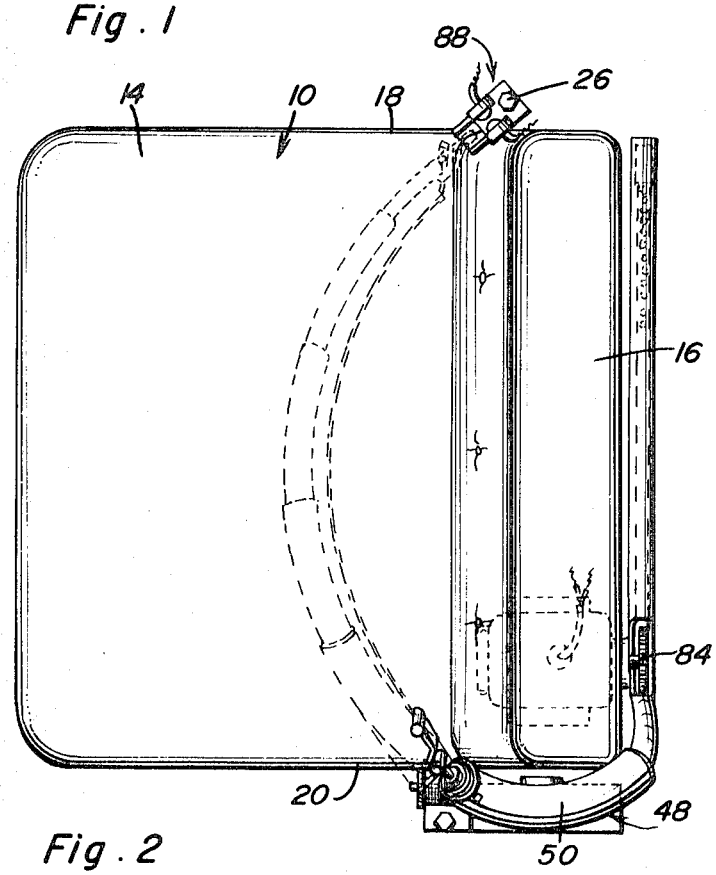
FIG. 1 is a top plan view of a motor vehicle seat with which the seatbelt assembly of the instant invention is operatively associated, protracted positions of the seatbelt element and seatbelt supporting and protracting structure being illustrated in phantom lines.

Referring now more specifically to the drawings, the numeral 10 generally designates a conventional bucket-type vehicle seat secured in any convenient manner upon the floor 12 of a vehicle. The seat 10 includes a seat cushion 14 and a seat back 16 and, of course, right- and left-hand sides 18 and 20.

A pair of right and left support brackets 22 and 24 are secured to the floor 12 by means of suitable fasteners 26 and a motor-mounting bracket 28 is also secured to the floor 12 beneath the rear marginal portion of the seat cushion 14 adjacent the left side 20 in any convenient manner (not shown).

The support bracket 24 comprises a portion of a spring reel-type seatbelt assembly referred to in general by the reference numeral 30. The assembly 30 includes a spring-urged rotary reel 32 and an elongated flexible seatbelt element 34 having one end secured to and partially wound on the reel 32. The other end of the seatbelt element 34 has an anchor bracket 36 secured thereto in any convenient manner and the bracket 36 includes a cylindrical portion 38 and a spring clamp portion 40, see FIG. 4.

A gear head motor 42 is mounted on the mounting bracket 28 in any convenient manner and includes a rotary drive shaft or output shaft 44 upon which a sprocket wheel 46 is mounted. In addition, a protractable and retractable arcuate support assembly referred to in general by the reference numeral 48 is provided and includes telescopingly engaged progressively smaller diameter arcuate tubular sections 50, 52, 54, 56, 58 and 60. The tubular sections 52, 54, 56, 58 and 60 include diametrically opposite longitudinally extending slots 62 and the tubular sections 50, 52, 54, 56 and 58 include radially inwardly projecting pins 64 slidingly received in the aforementioned slots 62 whereby the various sections are guidingly supported from each other for relative maximum extension and retraction. The extendible end of the section 60 includes a bulbous end portion 66 which is releasably anchorable in the spring clamp portion 40 and the tubular section 50 includes a centrally apertured rear wall 68.

Figure 2:
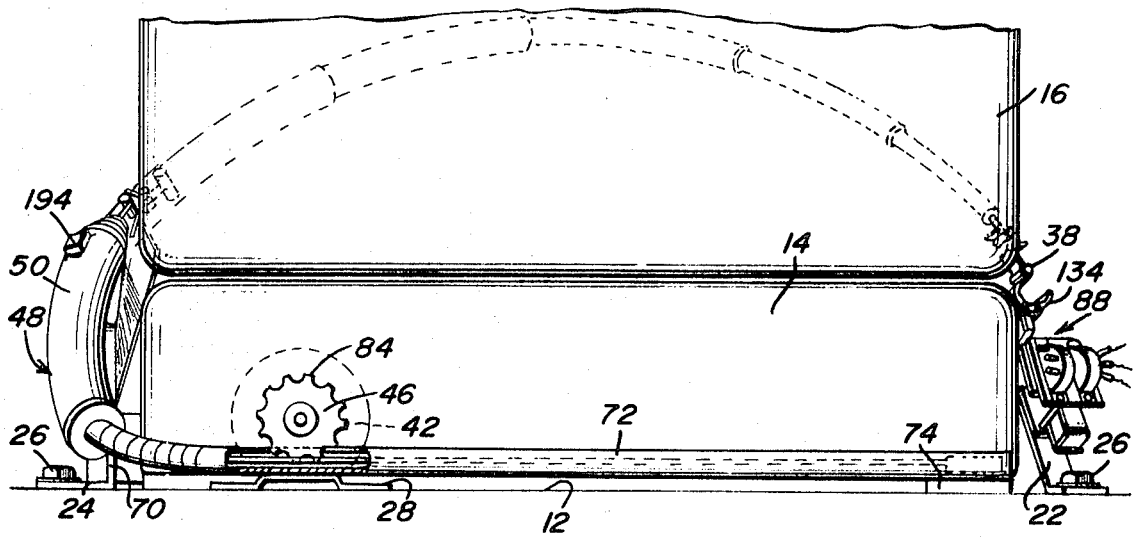
FIG. 2 is a fragmentary rear elevational view of the assemblage illustrated in FIG. 1.

The section 50 is rigidly supported from an upright 70 supported from the support bracket 24 and an elongated guide tube 72 extends across and is supported behind the seat cushion 14 by means of a mounting block 74 to which one end of the tube 70 is secured and the mounting bracket 28 to which the other end portion of the tube 72 is secured. The end portion of the tube 72 remote from the mounting block 74 is flexible and has its terminal end secured to the rear wall 68 about the central aperture 76 formed therein. An elongated flexible thrust member 78 is slidingly received in the tube 72 and includes a first end 80 which is anchored within the protractable end of the tubular section 60 immediately behind the end portion 66. The other end portion of the member 78 is slidingly received in the guide tube 72 and is provided with longitudinally spaced perforations 82 with which the teeth 84 on the sprocket wheel 46 are engageable. The portion of the guide tube 72 disposed adjacent the motor 42 is longitudinally slotted for the reception of the lower peripheral portion of the sprocket wheel 46 into the tube 72 and engagement of the teeth 84 with the perforations 82. Accordingly, rotation of the sprocket wheel 46 in a clockwise direction as viewed in FIG. 2 of the drawings will cause not only the thrust member 78 to be protracted but also the support assembly 48 to be protracted across the seat cushion 14 toward the support bracket 22. It would then of course follow that rotation of the sprocket wheel 46 in a counterclockwise direction will cause the thrust member 78 and support assembly 48 to be retracted toward the solid line position thereof illustrated in FIG. 2.

With attention now invited more specifically to FIGS. 2, 4 and 6–11 of the drawings, there will be seen an anchor assembly generally referred to by the reference numeral 88. The anchor assembly 88 includes a baseplate 90 which is supported from the support bracket 22 in any convenient manner. The baseplate 90 has a first mounting plate 92 stationarily supported therefrom and a second mounting plate 94 supported therefrom for limited rectilinear shifting through a sleeve-defining portion 96 carried by the baseplate 90. The mounting plate 92 has a first anchor bar 98 pivotally secured thereto as at 100 and the mounting plate 94 has a second anchor bar 102 pivotally supported therefrom as at 104. The free-swinging end of the anchor bar 98 includes a laterally projecting abutment arm 106 which is beveled as at 108 and the free-swinging end of the anchor bar 100 includes a laterally projecting abutment arm 110 which is notched as at 112, see FIG. 9.

The anchor bar 98 further includes a crosshead 114 against which the free ends of a pair of spring-urged switch actuators 116 and 118 abut, the switch actuators 116 and 118 comprising actuators for a pair of switches 120 and 122 supported from a support plate 124 stationarily mounted from the baseplate 90.

An elongated switch actuator slide 126 is slidingly supported from the baseplate 90 for rectilinear reciprocation relative thereto and includes a beveled cam face 128 which faces forwardly, see FIG. 9, and a rearwardly facing abutment face 130, see FIG. 8. The faces 128, 130 are defined on a head 132, see FIG. 9, at one end of the slide 126 and the other end of the slide 126 has a pair of semicylindrical jaws 134 and 136 pivotally secured thereto as at 138 and spring-urged apart by means of an expansion spring 140, see FIG. 6. In addition, a pair of rearwardly projecting abutment bars 142 and 144 are supported in stationary position from the baseplate 90 and are disposed for engagement by the convex surfaces of the jaws 134 and 136, respectively, as the slide 126 is moved in the direction of the arrow 146 in FIG. 8 of the drawings in order to close the jaws 134 about the cylindrical portion 38 as the support structure 48 is moved toward its fully extended position.

With attention now directed more specifically to FIG. 12 of the drawings, there will be seen the ignition switch 148 of the vehicle in which the seat 10 is mounted. The ignition switch 148 includes a terminal 150 such as the accessory terminal which is electrically connected to the battery 152 of the vehicle when the ignition switch 148 is on. A holding solenoid 154 is electrically connected to the terminal 150 by means of a conductor 156 and includes a spring-urged armature 158 including a pair of switch-actuating arms 160 and 162.

A conductor 164 electrically connects the conductor 156 with the switch 120 and has a switch 166 serially disposed therein which is closed by the arm 160 upon upward movement of the armature 158 when the solenoid 154 is actuated as the ignition switch 148 is turned on. In addition, a conductor 168 extends between the source 152 and the switch 122 and has a switch 170 serially connected therein. The switch 170 is normally open, as is the switch 166, and is closed by the arm 162 upon downward movement of the armature 158 under the biasing action of the spring 172 of the solenoid 154 when the ignition switch is turned off.

A pair of conductors 174 and 176 electrically connect the terminals 178 and 180 of the switch 122 to the forward and reverse terminals 182 and 184 of the motor 42 and a pair of conductors 186 and 188 electrically connect the terminals 190 and 192 to the conductors 174 and 176 intermediate the switch 122 and the motor 42. In addition, the conductor 176 has a cutoff switch 194 serially connected therein which is spring urged to the open position and is mounted on the exterior of the tubular section 50 for automatic closing in response to full retraction of the support structure 48.

The reel 32 of the seatbelt assembly 30 is provided with any suitable means (not shown) such as an automatically actuated ratchet assembly for limiting protraction of the seatbelt element 34 to a position with one a sufficient amount of the seatbelt element 34 unwound from the reel 32 to extend from the latter to the jaws 134 and 136 when the latter are in their closed positions.

Further, the reel 132 may be provided with a spring-applied ratchet assembly to prevent unwinding rotation of the reel 32 to allow free rotation of the reel 32 in a direction winding the seatbelt element 34 thereon with such a spring-applied ratchet assembly under the control of an unlatching solenoid 198 electrically connected to the conductor 74 through a conductor 200 whereupon the spring actuated ratchet mechanism of the seatbelt assembly 30 will be automatically rendered inoperative upon actuation of the unlatching solenoid 78 whenever the motor 42 is electrically connected to the source 152 through the conductor 174.

In operation, and assuming that the support assembly 48 and seatbelt element 34 are fully retracted with the end portion 66 releasably engaged in the spring clamp portion 40, the insertion of a key into the ignition switch 148 and the turning of the key so as to close the ignition switch 148 will electrically connect the solenoid 54 to the source 152 resulting in the switch 66 being closed and the electric motor 42 being electrically connected to the source 152 through the conductors 164, 168 and 174. In addition, the unlatching solenoid 198 will also be actuated so as to release the ratchet mechanism and allow rotation of the sprocket wheel 46 in a clockwise direction to extend the thrust member 78 and thus the tubular sections 52, 54, 56, 58 and 60 of the support assembly 48. Extension of the support assembly 48 will of course cause the anchor bracket 36 carried by the free end of the seatbelt element 34 to be swung across the seat cushion 14 from the left side thereof to the right side thereof and engagement of the cylindrical portion 38 between the open jaws 134 and 136. As the thrust member 78 is further protracted, the thrust of the cylindrical portion 38 on the pivot axes of the jaws 34 and 36 will cause the latter to be cammed closed about the cylindrical portion 38 by the bars 142 and 144 whereupon the slide 126 will move from the position thereof illustrated in FIG. 6 of the drawings slightly past the position illustrated in FIG. 8 of the drawings in the direction of the arrow 146 so as to cam the head 132 beneath the beveled end of the arm 106. As the arm 106 reaches the position thereof illustrated in FIG. 8 of the drawings, the actuator 116 is sufficiently upwardly deflected by the crosshead 114 to actuate the switch 120 and electrically connect the motor 42 to the source 152 through the conductors 188 and 176 instead of through the conductors 186 and 174 to thereby reverse operation of the motor 42. However, before this reversing operation can be initiated, the head 132 slips behind the arm 106 and thus the latter engages the abutment face 130 of the head 132 and prevents withdrawal of the slide 126. Therefore, when the motor 42 is reversed and the support assembly 48 begins its retractive movement, the end portion 66 becomes disengaged from the spring clamp portion 40 so as to allow full retraction of the support assembly 48 while maintaining the protracted end of the seatbelt element 34 securely anchored to the anchor assembly 88. Return of the support assembly 48 to the fully retracted position will of course cause the switch 194 to open and thus the operation of the motor 42 is terminated.

When the ignition switch is turned off, the solenoid 154 is deactuated and thus the armature 158 drops under the biasing action of the spring 172 and causes the arm 162 to close the switch 170 whereby the electric motor is again electrically connected to the source 152 through the conductors 168 and 174. Thus, the sprocket wheel 46 is again rotated in a clockwise direction to protract the support assembly 48 whereupon the end portion 46 is again releasably clampingly engaged in the spring clamp portion 40 and the slide 126 is further advanced in order that the head 132 will be cammed beneath the arm 110 as illustrated in FIG. 9 of the drawings with the head 132 seated in the notch 112. As the anchor bar 102 reaches the position thereof illustrated in FIG. 9 of the drawings, its pivoting movement causes the anchor bar 98 to again be pivoted to a position whereby the crosshead 114 urges the actuators 116 and 118 away from the baseplate 90 and thus the switch 122 is actuated to electrically connect the motor 42 to the source 52 through the conductor 176. Accordingly, operation of the motor 42 is again reversed and the support assembly 48 begins its initial retraction. As the slide 126 is retracted, the anchor bar 100 and its mounting plate 94 slide relative to the baseplate 90 to the limit positions thereof illustrated in FIG. 10 of the drawings whereupon further retraction of the support assembly 48 will cause the head of the slide 122 to be cammed out of the notch 112 and past the beveled face 108 of the arm 106 so that the slide 126 may then be retracted to the position thereof illustrated in FIGS. 6 and 7 of the drawings in which the jaws 136 and 134 are shifted from between the bars 142 and 144. This positioning of the jaws 134 and 136 of course enables the latter to open to the positions thereof illustrated in FIG. 6 of the drawings whereby the cylindrical portion 38 will be released so that continued retraction of the support assembly 48 may also effect retraction of the seatbelt element 134 under the biasing action of the corresponding spring-urged reel 32.

The switches 120 and 122 may be conventional automotive headlight dimmer switches whereby inward movement of the corresponding actuators 116 and 118 will cause alternate circuits to the motor 42 to be actuated.

Each of the switch actuators 116 is spring biased by means of a compression spring 202 and in this manner, the crosshead 114 is continuously urged toward the baseplate 90 thereby also continuously urging the anchor bars 98 and 102 toward the positions thereof illustrated in FIG. 7 of the drawings.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a vehicle having a seat therein including opposite sides, a seatbelt assembly supported adjacent one side of said seat and including an elongated flexible seatbelt element having a first end extendible and retractable toward and away from the other side of said seat, an anchor assembly supported adjacent the other side of said seat, a support assembly mounted adjacent said one side of said seat and including a portion protractable from said one side of said seat to the other side thereof, motor means drivingly connected to said portion for protracting and retracting the latter, said anchor assembly and said first end including coacting means to automatically anchor said first end to said anchor assembly in response to protraction of said first end to a first position just short of a fully protracted position and to release said first end for retraction in response to said first end being subsequently further protracted to a second fully protracted position, said portion and said first end including means releasably securing said first end to said portion for protraction therewith to said first position and subsequent retraction of said portion independent of retraction of said first end, and control means operatively associated with said motor means, said anchor assembly and said support assembly operative, when initially actuated, to sequentially (1) actuate said motor means for protracting said portion to carry said first end to said first position thereof, (2) actuate said motor means to retract said support means independent of retraction of said first end and (3) terminate operation of said motor means, said control means when subsequently actuated for the second time, being operative to sequentially (1) actuate said motor means for again protracting said portion to said first end and further protracting said first end to said second position thereof, (2) actuate said motor means to retract said support means with said first end attached thereto, and (3) terminate operation of said motor means.

2. The combination of claim 1 wherein said vehicle includes an ignition switch, said control means being controlled by said ignition switch, the latter being operative to first actuate said control means when the ignition switch is turned on and to actuate the control means for the second time when said ignition switch is subsequently turned off.

3. The combination of claim 2 wherein said control means includes a pair of electrical circuits for electrically connecting said motor means to a suitable source of electrical potential and a pair of motor-reversing switches serially disposed in said circuits and supported from said anchor assembly for actuation by said first end both when said first end is shifted to said first position and also when said first end is shifted to said second position, said ignition switch being serially disposed in one of said circuits.

4. In combination with a vehicle having a seat therein including opposite sides, a seat belt assembly supported adjacent one side of said seat and including an elongated flexible seatbelt element having a first end extendible and retractable toward and away from the other side of said seat, an anchor assembly supported adjacent the other side of said seat, a support and drive assembly disposed at said one side of said seat and including a portion thereof protractible toward and retractable away from said anchor assembly and releasably engaged with said first end for extending and retracting said first end to and away from said anchor assembly, said anchor assembly including means operative to secure said first end thereto against retraction with said portion of said support and drive means as said first end is first extended to said anchor means and to release said first end for retraction with said support and drive means upon subsequent protraction of said portion toward said anchor assembly.

5. The combination of claim 4 wherein said support and drive means includes a control system, said vehicle including a source of electrical potential and an ignition switch electrically connected to said source, said control system including a first section electrically connected to said source through said ignition switch and a control switch portion which is closed in response to said ignition switch being turned on and opened in response to said ignition switch being turned off and a second section electrically connected to said source through a control switch portion which is opened in response to said ignition switch being turned on and closed in response to said ignition switch being turned off.

6. In combination with a vehicle including an ignition switch electrically connected to a source of electrical potential and a seat having opposite sides, a seatbelt assembly including an elongated seatbelt having one end anchored at one side of said seat, an anchor assembly disposed adjacent the other side of said seat, and electrically driven seatbelt support and drive means controlled by said ignition switch and operative to guidingly support and protract the other end of said seatbelt toward said anchor assembly and secured to said other end to said assembly in response to said ignition switch being turned on and to release said other end from said anchor assembly and retract said other end to said one side of said seat in response to said ignition switch being turned off.

7. The combination of claim 6 wherein said seatbelt support and drive means includes an elongated telescoping member including an extendible and retractable end reciprocal along an arcuate path extending between said opposite sides.

8. The combination of claim 7 wherein said extendible and retractable end includes means releasably engageable with said other end of said seatbelt.

9. The combination of claim 8 wherein said extendible and retractable end is extended and retracted when said other end is protracted toward and secured to said anchor assembly and again extended and retracted when said other end is released from said anchor assembly and retracted toward said one side of said seat.